(12) United States Patent
Van Hulst et al.

(10) Patent No.: US 10,323,774 B2
(45) Date of Patent: Jun. 18, 2019

(54) MOUNTING DEVICE WITH SELF-CENTERING SUPPORT SURFACE

(71) Applicant: HellermannTyton Corporation, Milwaukee, WI (US)

(72) Inventors: Kenneth J. Van Hulst, Delevan, WI (US); Gerard G. Geiger, Jackson, WI (US); Ethan J. Fish, Menomonee Falls, WI (US)

(73) Assignee: HELLERMANNTYTON CORPORATION, Milwaukee, WI (US)

( * ) Notice: Subject to any disclaimer, the term of this patent is extended or adjusted under 35 U.S.C. 154(b) by 0 days.

(21) Appl. No.: 15/690,986

(22) Filed: Aug. 30, 2017

(65) Prior Publication Data

US 2018/0058609 A1    Mar. 1, 2018

Related U.S. Application Data

(60) Provisional application No. 62/382,526, filed on Sep. 1, 2016.

(51) Int. Cl.
| | | |
|---|---|---|
| *F16L 3/137* | (2006.01) | |
| *F16L 3/127* | (2006.01) | |
| *F16L 3/233* | (2006.01) | |
| *F16B 39/32* | (2006.01) | |
| *B65D 63/00* | (2006.01) | |
| *F16B 2/08* | (2006.01) | |
| *F16B 37/08* | (2006.01) | |

(Continued)

(52) U.S. Cl.
CPC ............... *F16L 3/137* (2013.01); *F16B 2/08* (2013.01); *F16B 37/0842* (2013.01); *F16B 37/0857* (2013.01); *F16B 39/32* (2013.01); *F16L 3/127* (2013.01); *H02G 3/32* (2013.01); *B65D 63/1018* (2013.01); *F16L 3/233* (2013.01)

(58) Field of Classification Search
CPC . F16L 3/137; F16L 3/127; F16L 3/233; F16L 3/237; F16B 2/08; F16B 37/0842; F16B 37/0857; F16B 39/32; H02G 3/32; B65D 63/1018
See application file for complete search history.

(56) References Cited

U.S. PATENT DOCUMENTS

| | | | |
|---|---|---|---|
| 3,632,071 A | * | 1/1972 | Cameron ................. F16L 3/08 24/16 PB |
| 5,598,994 A | | 2/1997 | Olewinski et al. |

(Continued)

*Primary Examiner* — Tan Le
(74) *Attorney, Agent, or Firm* — Robert J. Myers (57) ABSTRACT

A mounting device configured to secure an elongate element to a threaded stud using a flexible cable tie is described herein. The mounting device includes a body portion defining a cavity oriented along a longitudinal axis having an opening configured to receive the stud. The cavity defines a flexible pawl configured to engage a thread of the plurality of helical threads, thereby securing the mounting device to the stud. The mounting device also includes a support portion arranged on a distal end of the body portion opposite the opening having a support surface configured to engage the elongate element and a first enclosed channel arranged along a lateral axis. The first channel defines a first pair of cable tie apertures configured to receive the flexible cable tie as it is wrapped about the elongate element, thereby securing the elongate element to the mounting device.

20 Claims, 11 Drawing Sheets

(51) Int. Cl.
*H02G 3/32* (2006.01)
*B65D 63/10* (2006.01)

(56) References Cited

U.S. PATENT DOCUMENTS

| | | | |
|---|---|---|---|
| 5,820,083 A | 10/1998 | Geiger | |
| 6,196,751 B1* | 3/2001 | Khokhar | F16D 1/08 |
| | | | 24/16 PB |
| 6,240,602 B1* | 6/2001 | Geiger | F16L 3/137 |
| | | | 24/16 PB |
| 6,533,226 B2* | 3/2003 | Geiger | F16L 3/233 |
| | | | 248/68.1 |
| 7,437,804 B1* | 10/2008 | Geiger | B65D 63/1072 |
| | | | 24/16 PB |
| 8,028,962 B2* | 10/2011 | Geiger | F16L 3/2332 |
| | | | 174/656 |
| 2016/0223100 A1 | 8/2016 | Geiger | |
| 2018/0058609 A1* | 3/2018 | Van Hulst | F16B 2/08 |

* cited by examiner

MOUNTING DEVICE WITH SELF-CENTERING SUPPORT SURFACE

CROSS-REFERENCE TO RELATED APPLICATION

This application claims the benefit under 35 U.S.C. § 119(e) of U.S. Provisional Patent Application No. 62/382,526 filed on Sep. 1, 2016, the entire disclosure of which is hereby incorporated by reference.

TECHNICAL FIELD OF INVENTION

This invention generally relates to specialized mounting devices for use with cable ties and threaded studs. More particularly, the invention relates to a mounting device that can be secured on one end to a structural support having a threaded stud protruding therefrom. On the opposite end, the mounting device includes a self-centering support surface for supporting one or more hoses, wires, cables or tube bundles with one or more cable ties.

BACKGROUND OF THE INVENTION

Molded plastic cable ties are known in the art and are used to secure elongate items, such as hoses, wires, cables, and/or tubes, into tight bundles. The cable tie strap encircles the item or items to be bundled and is secured in the cable tie head with a pawl.

These cable ties are also used to secure the elongate items to a structural member such as a vehicle frame rail, firewall, fender, body panel, bracket Presently, mounting devices used in conjunction with cable ties or other strap-like bundling means are limited to configurations in which the mount and attached items are secured to a structural support member by way of communicating apertures through the structural member and mounting device. This arrangement typically requires drilling and tapping through the structural member to create the attachment aperture. This attachment means is sufficient in applications using support material in which an aperture can be readily formed, but is not practical when an aperture is not easily made in a predetermined support structure, such as when the reverse side of the support structure is not accessible. Further, the support material may be of an unworkable thickness. Also to be considered is the process of drilling and possibly tapping an aperture in the mounting device, which may be undesirably slow and labor intensive, adding to the overall cost of the end product. It may also be undesirable to create an aperture in a mounting device, such as in instances in which leakage or corrosion through the aperture is possible. Therefore, a mounting device configured for use with a cable tie that does not require an aperture remains desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, a mounting device configured to secure an elongate element to a stud having a plurality of helical threads defined in an outer surface of the stud using a flexible cable tie is provided. The mounting device includes a body portion defining a cavity oriented along a longitudinal axis having an opening configured to receive the stud. The cavity defines a flexible pawl configured to engage a thread of the plurality of helical threads, thereby securing the mounting device to the stud. The mounting device also includes a support portion arranged on a distal end of the body portion opposite the opening having a support surface configured to engage the elongate element and a first enclosed channel arranged along a lateral axis. The first channel defines a first pair of cable tie apertures configured to receive the flexible cable tie as it is wrapped about the elongate element, thereby securing the elongate element to the mounting device.

The cavity may define a plurality of flexible pawls configured to engage the thread of the plurality of helical threads. Each flexible pawl in the plurality of flexible pawls is arranged opposite another flexible pawl in the plurality of flexible pawls.

The support portion may have a side support surface configured to engage the elongate element. The support portion may also define a second enclosed channel having an axis that is generally perpendicular to the longitudinal axis and generally perpendicular to the lateral axis. The second channel defines a second pair of cable tie apertures configured to receive the flexible cable tie as it is wrapped about the elongate element, thereby securing the elongate element to the mounting device. The support portion may have another side support surface opposite the side support surface that is configured to engage the elongate element. The support portion may define a third enclosed channel having an axis that is generally parallel to the second enclosed channel. The third channel defines a third pair of cable tie apertures that are configured to receive the flexible cable tie as it is wrapped about the elongate element, thereby securing the elongate element to the mounting device. The support portion may define a fourth enclosed channel having an axis that is generally parallel to the longitudinal axis and generally perpendicular to the lateral axis. The fourth channel may define a fourth pair of cable tie apertures that are configured to receive the flexible cable tie as it is wrapped about the elongate element, thereby securing the elongate element to the mounting device. The support portion may define a fifth enclosed channel having an axis that is generally parallel to the fourth enclosed channel. The fifth channel may define a fifth pair of cable tie apertures that are configured to receive the flexible cable tie as it is wrapped about the elongate element, thereby securing the elongate element to the mounting device.

The side support surface may be characterized as having a generally concave shape. The body portion may be characterized as having a generally cylindrical shape. Alternatively, the body portion and the cavity may be characterized as having an X-shaped cross section. In this case, the cavity defines four flexible pawls configured to engage the thread of the plurality of helical threads and each leg of the X-shaped cavity defines one of the flexible pawls.

The flexible pawl may define a plurality of teeth configured to engage the plurality of helical threads.

The support surface may be characterized as having a generally circular shape. The cavity may define another flexible pawl configured to engage a thread of the plurality of helical threads located opposite the flexible pawl and wherein the flexible pawl and another flexible pawl are offset by 45 degrees from the lateral axis of the first channel.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which.

Like features and structural elements are referred to by like reference numbers.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. While the preferred embodiments have been described, the details may be changed without departing from the invention.

A mounting device that is configured to secure an elongate element, such as, such as electrical wiring, fiber optic cables, pneumatic lines, hydraulic lines and the like, to a threaded stud protruding from a structural member using a flexible cable tie is described herein. The mounting device includes a support surface that, in conjunction with the cable tie, self-centers the elongate element on the support surface. The mounting device serves to elevate the elongate element above the structural member and orient the elongate element relative to the structural member.

Figure 1:
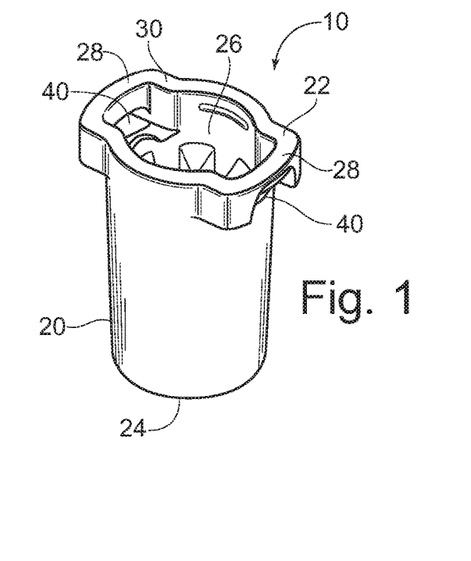
FIG. 1 is a perspective view of a stud mount with self-centering support in accordance with a first embodiment of the invention.
Figure 2:
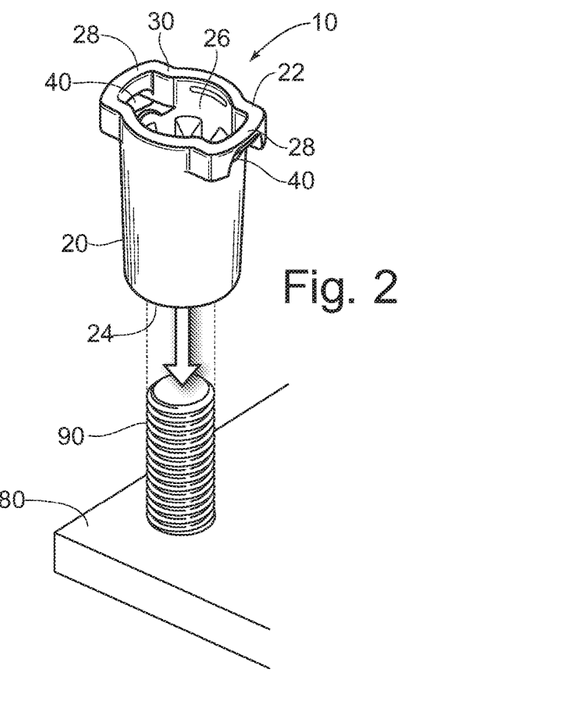
FIG. 2 is a perspective view showing the stud mount of FIG. 1 being placed upon a threaded stud in accordance with the first embodiment of the invention.
Figure 3:
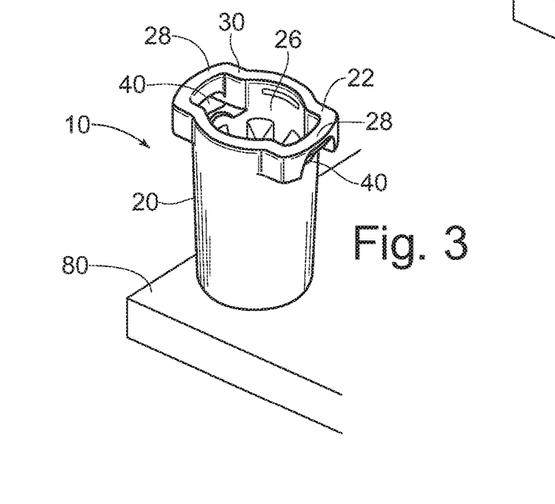
FIG. 3 is a perspective view showing the stud mount of FIG. 1 placed upon a threaded stud in accordance with the first embodiment of the invention.
Figure 4:
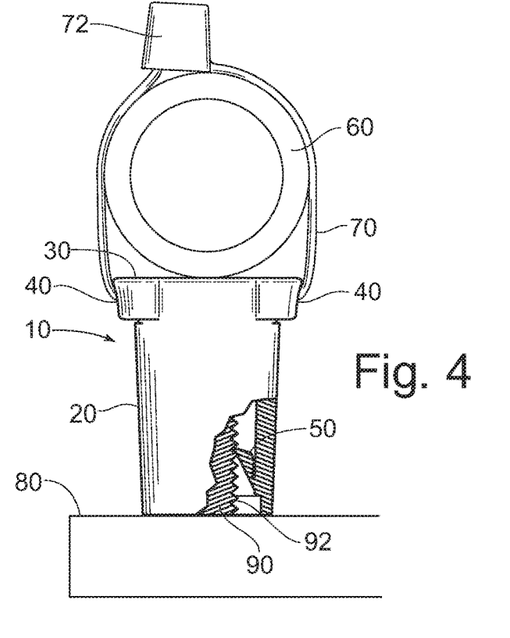
FIG. 4 is a front elevation view of the stud mount of FIG. 1 supporting a single bundle in accordance with the first embodiment of the invention.
Figure 5:
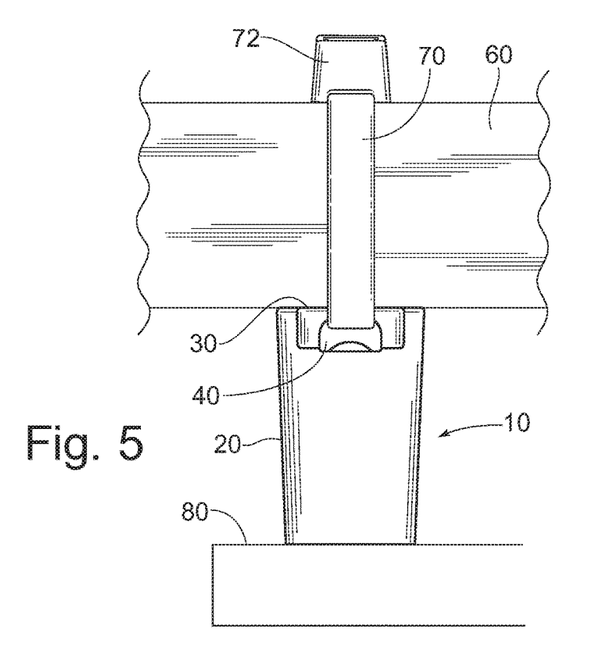
FIG. 5 is a side elevation view of the stud mount of FIG. 1 supporting a single bundle in accordance with the first embodiment of the invention.
Figures 6, 7, 8:
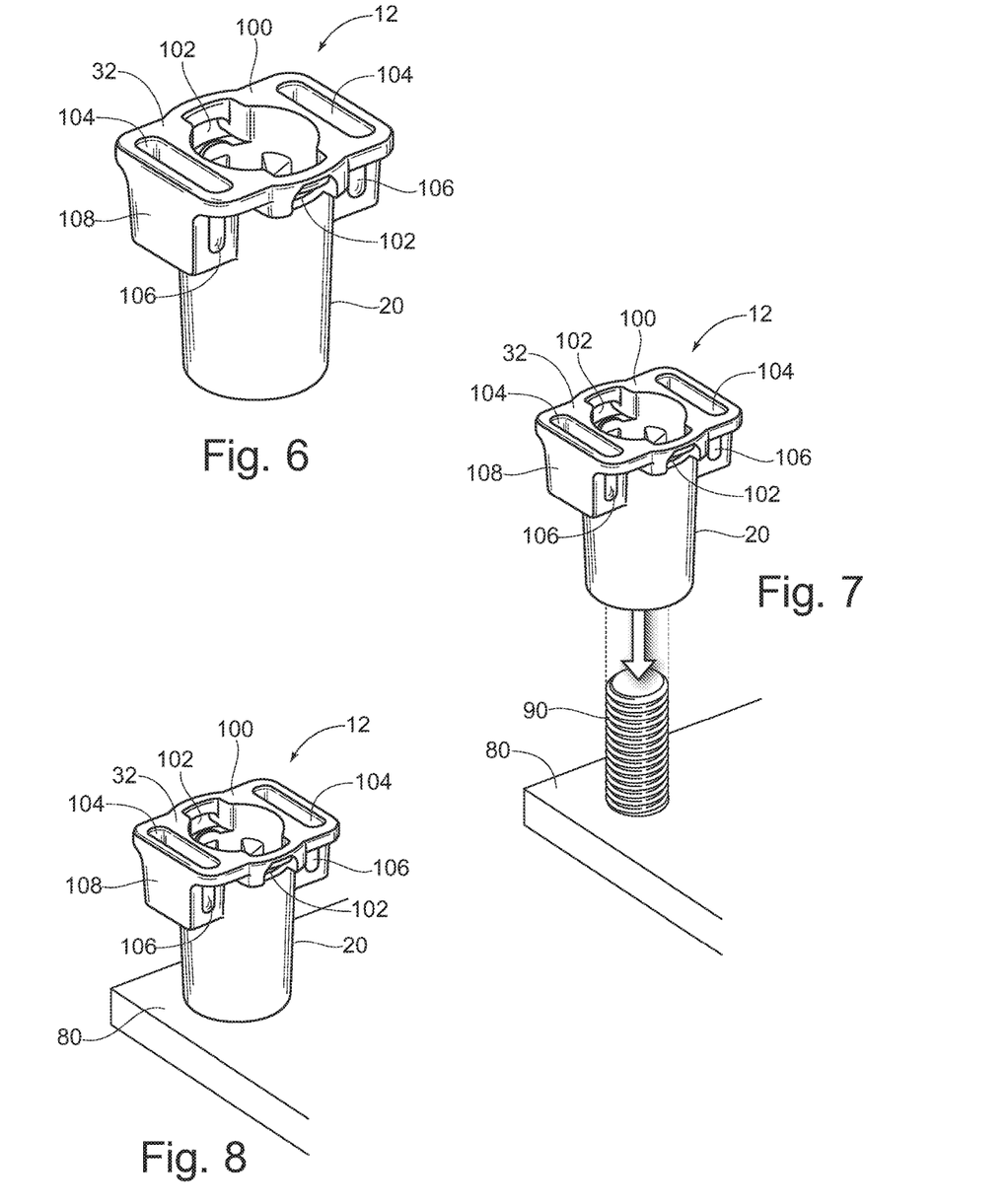
FIG. 6 is a perspective view of a stud mount with self-centering support in accordance with a second embodiment of the invention.
FIG. 7 is a perspective view showing the stud mount of FIG. 6 being placed upon a threaded stud in accordance with the second embodiment of the invention.
FIG. 8 is a perspective view showing the stud mount of FIG. 6 placed upon a threaded stud in accordance with the second embodiment of the invention.

Referring to the drawings, and, in particular to FIGS. 1, 2 and 3, a non-limiting example of a mounting device 110 embodying the various features of the invention is shown. The mounting device 110 functions to secure elongate items 60, such as electrical wiring, fiber optic cables, pneumatic lines, hydraulic lines and the like, or a combination of any of these (as shown in FIGS. 4 and 5), to an adjacent structural member 80. The structural member 80 has a cylindrical post, such as a threaded stud 90, affixed to and protruding from its surface. It will be apparent that a "bundle" may comprise multiple wires or cables that are flexible or rigid, or fluid transporting hoses or tubes. Some elongate items may also be contained within a conventional tubular conduit. The mounting device 110 is particularly well suited for use in the transportation industry where it can be used to secure wiring harnesses and/or fluid carrying lines to a structural member such as a vehicle frame rail, firewall, fender, body panel, bracket or other structural members having a protruding cylindrical post, preferably a threaded stud.

As illustrated, in the views of FIGS. 1 and 4, the mounting device 110 includes four principal components, namely a cylindrical body 120, a support surface 130, an enclosed channel 140 having cable tie apertures, and a locking pawl 150.

As shown in FIG. 1, the mounting device 110 has a generally cylindrical body 120 defining a cavity 121 extending from a top surface 122 to a bottom surface 124. The bottom surface 124 has a generally circular bottom opening 125 extending into the cavity 121. The bottom opening 125 is configured to receive the threaded stud 90. The top surface 122 also has a top opening 126 extending through the top surface 122 into the cavity 121. The top opening 126 is characterized as having a generally circular central section and two rectangular sections extending laterally therefrom. There are a pair of protrusions 128 extending laterally from the cylindrical body 120 from opposite sides of the top opening 126. The top surface 122, including the protrusions 128, forms a saddle-like support surface 130 for supporting an elongate element as discussed above. As best shown in FIGS. 2 and 3, the height of the cylindrical body 120 is sufficient to allow the insertion of a threaded stud 90 through the bottom opening 125.

Now referring to FIG. 4, it can be seen that a flexible locking pawl 150 is formed within the cavity 121 of cylindrical body 120. The locking pawl 150 engages with one or more threads 92 of threaded stud 90 to secure the mounting device 110 to the structural member 80.

As best shown in FIG. 4, the elongated member 60 is attached to the support surface 130 of the mounting device 110, which can be accomplished before or after the mounting device 110 is secured to the threaded stud 90. A flexible cable tie 70 having a locking head 72 is inserted through the enclosed channel 140 in the protrusions 128 of the top surface 122. The cable tie 70 is wrapped about the elongated member 60 and the tie tail (not shown) is passed through the locking head 72 and pulled tight to secure the elongated member 60. Optionally, the excess portion of the tie tail may be cut just above the locking head 72. Other types of cable ties or straps known to those skilled in the art may alternatively be used to attach the elongated member 60 to the support surface 130 of the mounting device 110.

As further shown in FIGS. 4 and 5, the cable tie 70 secures the elongated member 60 elevated above the threaded stud 90 and structural member 80. The elongated member 60 is on-center or in-line with the threaded stud 90 which is beneficial for harness routing purposes.

Figure 9:
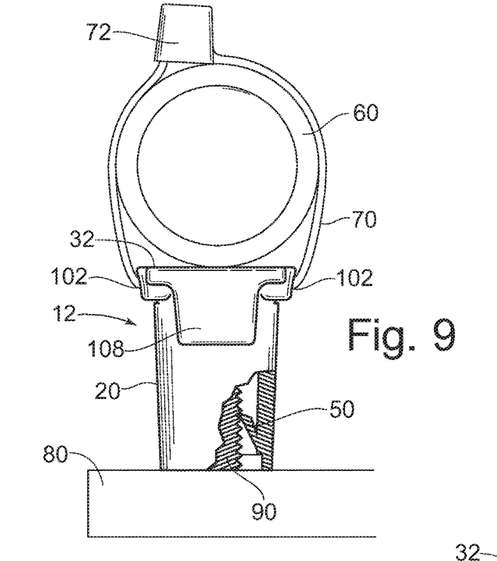
FIG. 9 is a front elevation view of the stud mount of FIG. 6 supporting a single bundle in accordance with the second embodiment of the invention.
Figure 10:
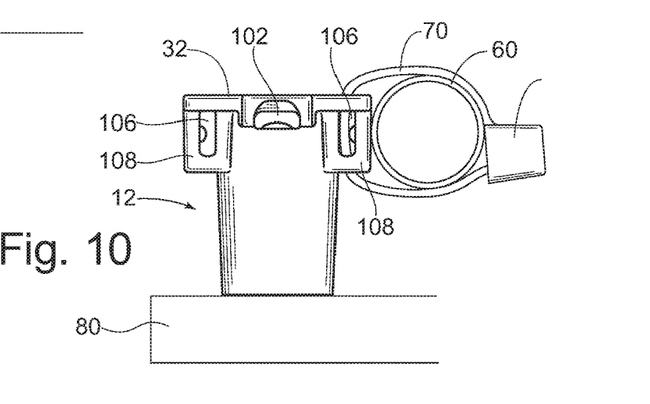
FIG. 10 is a side elevation view of the stud mount of FIG. 6 supporting a single bundle in accordance with the second embodiment of the invention.
Figure 11:
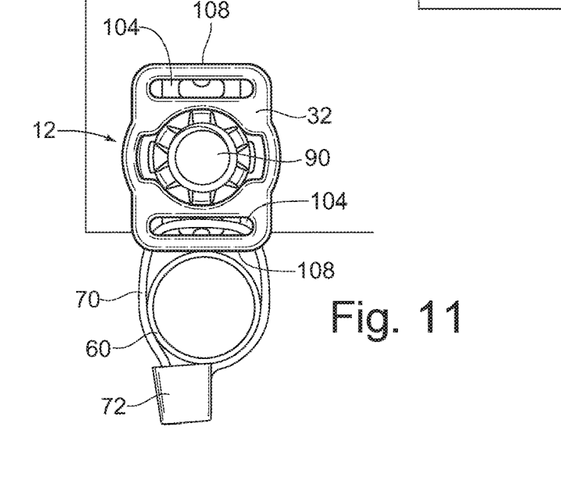
FIG. 11 is a top plan view of the stud mount of FIG. 6 a single bundle in accordance with the second embodiment of the invention.
Figures 12, 13, 14:
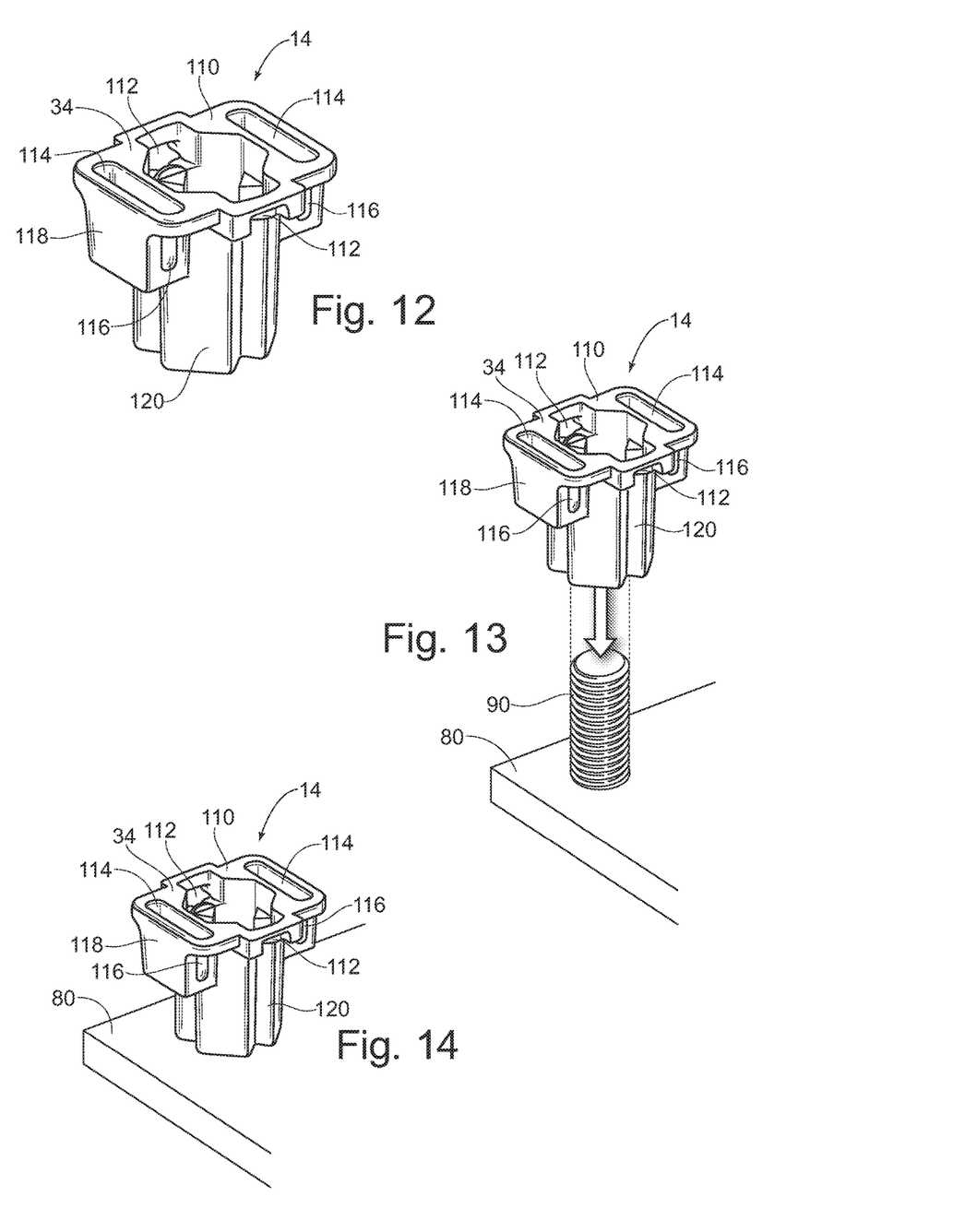
FIG. 12 is a perspective view of a stud mount with self-centering support in accordance with a third embodiment of the invention.
FIG. 13 is a perspective view showing the stud mount of FIG. 12 being placed upon a threaded stud in accordance with the third embodiment of the invention.
FIG. 14 is a perspective view showing the stud mount of FIG. 12 placed upon a threaded stud in accordance with the third embodiment of the invention.

A second non-limiting example of a mounting device 210 is shown in FIGS. 6 through 11. The mounting device 210 has a substantially similar cylindrical body 220 and locking pawl 250. The mounting device 210 incorporates an alternatively saddle-like support surface 230. The support surface 230 has a robust top surface 222 having an enclosed channel 240 and side support surfaces 226 having enclosed channels 244, 246. These channels 240, 244, 246 are configured for receiving cable ties 70. As shown in FIG. 9, the benefits of the mounting device 210 include allowing the cable tie 70 to span through the channel 240 in the cylindrical body 220 below the support surface 230. The cable tie 70 secures the elongated member 60 elevated above the threaded stud 90 and the structural member 80. The elongated member 60 is on-center or in-line with the threaded stud 90 which is beneficial for harness routing purposes. As shown in FIGS. 10 and 11, additional elongated members 60 may be secured to the side support surfaces 226 of the mounting device 210 by inserting a cable tie 70 through the channel 244 and/or the channel 246. The elongated members 60 may be secured to the side support surfaces 226 either parallel to cylindrical body 220 (longitudinally) by using the enclosed channels 246 or perpendicular to cylindrical body 220 (laterally) by using the enclosed channels 244. Like the elongated members 60 described above, any elongated members 60 mounted to the side support surfaces 226 is also on-center or in-line with the threaded stud 90 which is beneficial for harness routing purposes.

Figure 15:
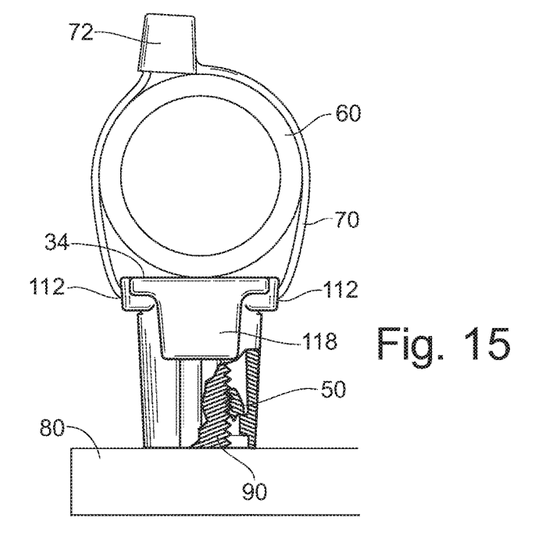
FIG. 15 is a front elevation view of the stud mount of FIG. 12 supporting a single bundle in accordance with the third embodiment of the invention.
Figure 16:
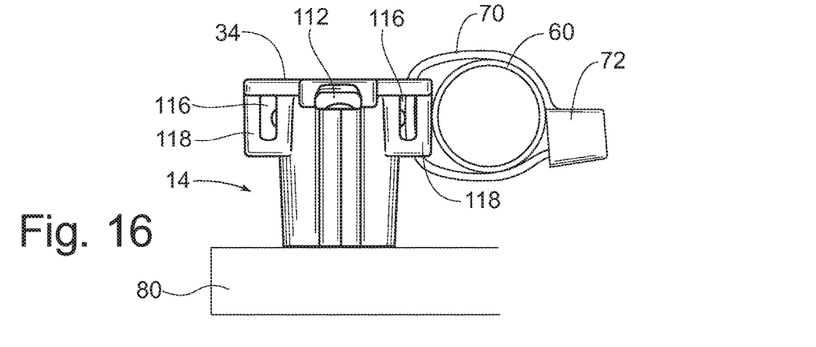
FIG. 16 is a side elevation view of the stud mount of FIG. 12 supporting a single bundle in accordance with the third embodiment of the invention.
Figure 17:
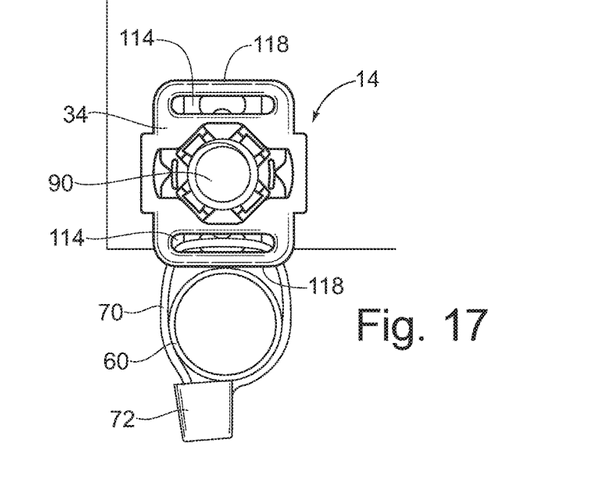
FIG. 17 is a top plan view of the stud mount of FIG. 12 supporting a single bundle in accordance with the third embodiment of the invention.
Figures 18, 19, 20:
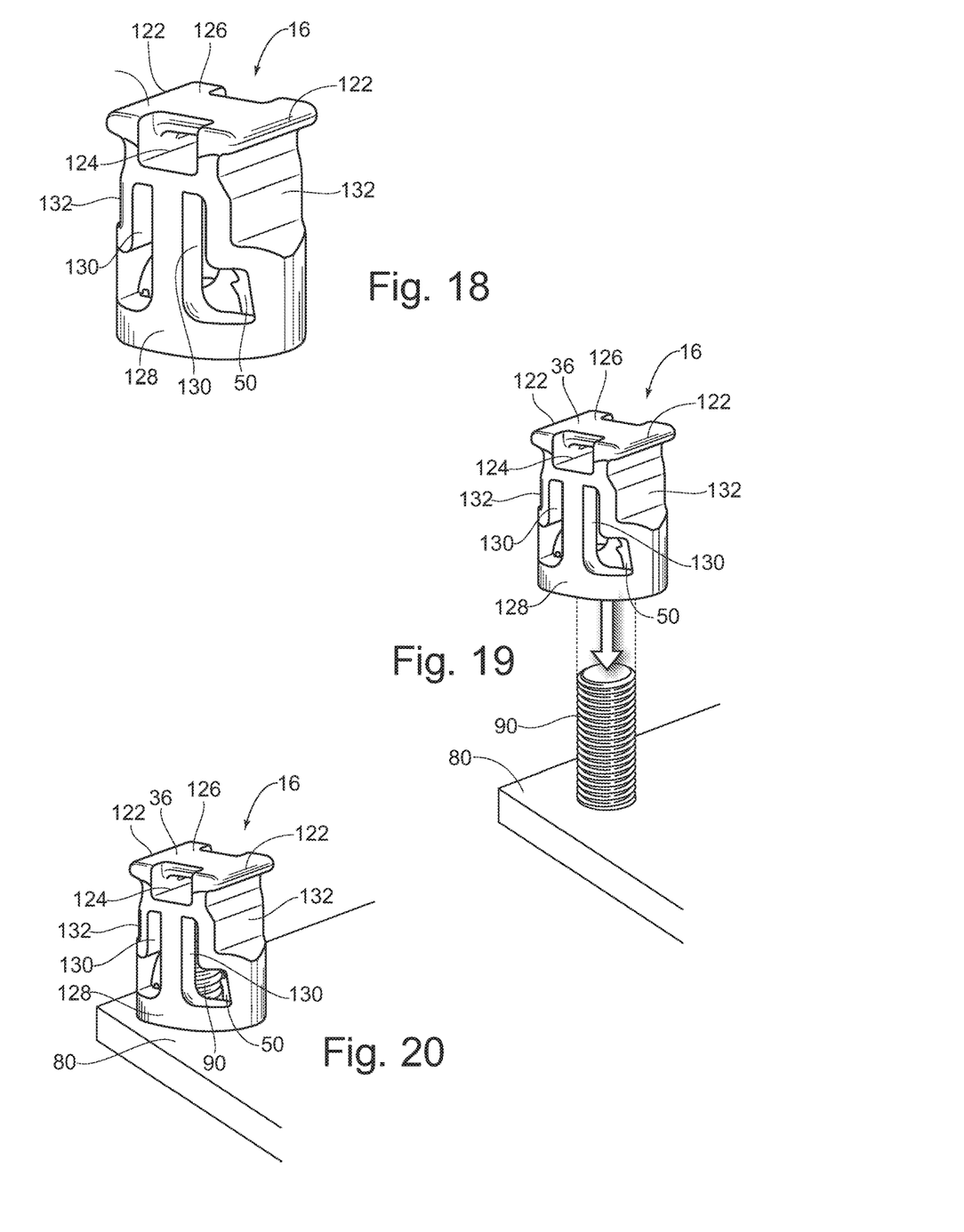
FIG. 18 is a perspective view showing a stud mount with self-centering support in accordance with a fourth embodiment of the invention.
FIG. 19 is a perspective view showing the stud mount of FIG. 18 being placed upon a threaded stud in accordance with the fourth embodiment of the invention.
FIG. 20 is a perspective view showing the stud mount of FIG. 18 placed upon a threaded stud in accordance with the fourth embodiment of the invention.

A third non-limiting example of a mounting device 310 is shown in FIGS. 12 through 17. The mounting device 310 has a X-shaped body 320. Similar to the first and second mounting devices 110, 210, the X-shaped body 320 also includes a substantially similar locking pawl 350 in each leg of the X-shaped body 320. The mounting device 310 incorporates a saddle-like support surface 330 similar to that of the second mounting device 210. The support surface 330 has a robust top surface 322 having an enclosed channel 340 and side support surfaces 326 having enclosed channels 344, 346. These channels 340, 344, 346 are configured for receiving cable ties 70. As shown in FIG. 15, the benefits of the mounting device 310 include allowing the cable tie 70 to span across the channel 340 in the X-shaped body 320 just below the support surface 330. The cable tie 70 secures the elongated member 60 elevated above the threaded stud 90 and structural member 80. The bundle is on-center or in-line with the threaded stud 90 which is beneficial for harness routing purposes. As shown in FIGS. 16 and 17, additional elongated members 60 may be secured to the side support surfaces 326 of the mounting device 310. Elongated members 60 may be secured to the side support surfaces 326 either parallel to the X-shaped body 320 (longitudinally) by using the channels 346 and/or perpendicular to the X-shaped body (laterally) by using the channels 344. Like the elongated members 60 described above, any elongated members 60 mounted to the side support surfaces 326 is also on-center or in-line with the threaded stud 90 which is beneficial for harness routing purposes.

Figure 21:
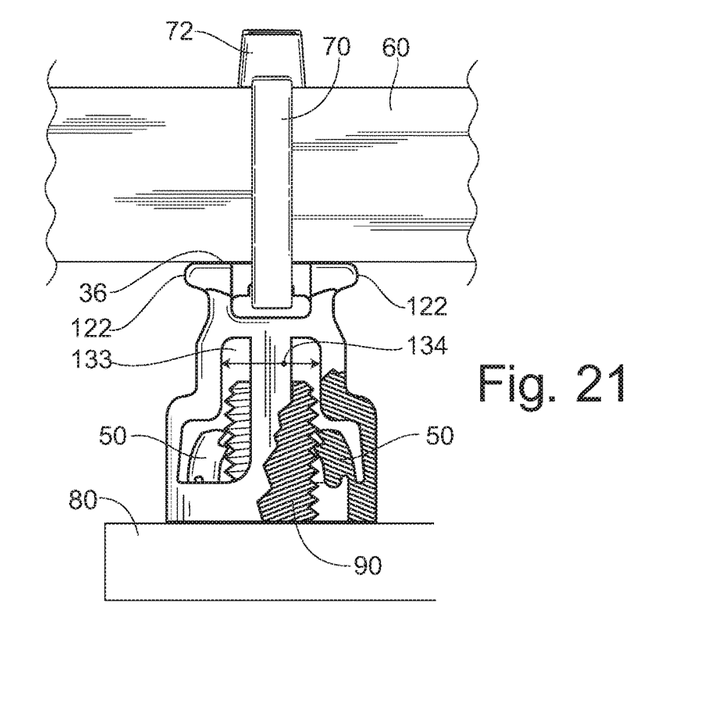
FIG. 21 is a front elevation view of the stud mount of FIG. 18 supporting a single bundle in accordance with the fourth embodiment of the invention.
Figure 22:
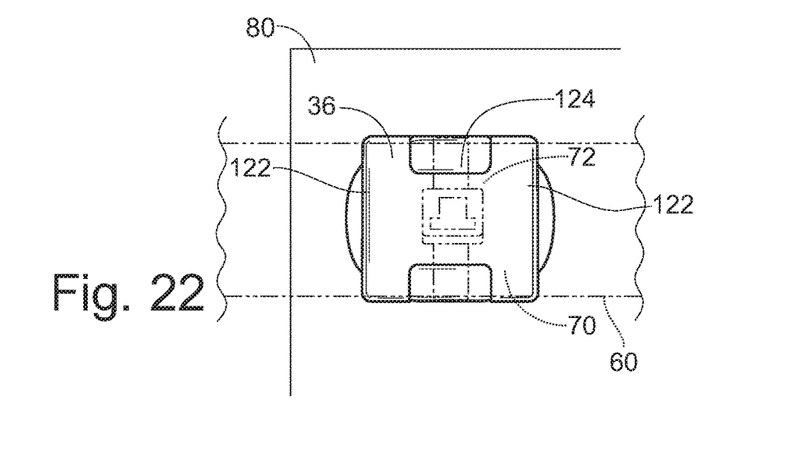
FIG. 22 is a top plan view of the stud mount of FIG. 18 in accordance with the fourth embodiment of the invention.
Figures 23, 24, 25:
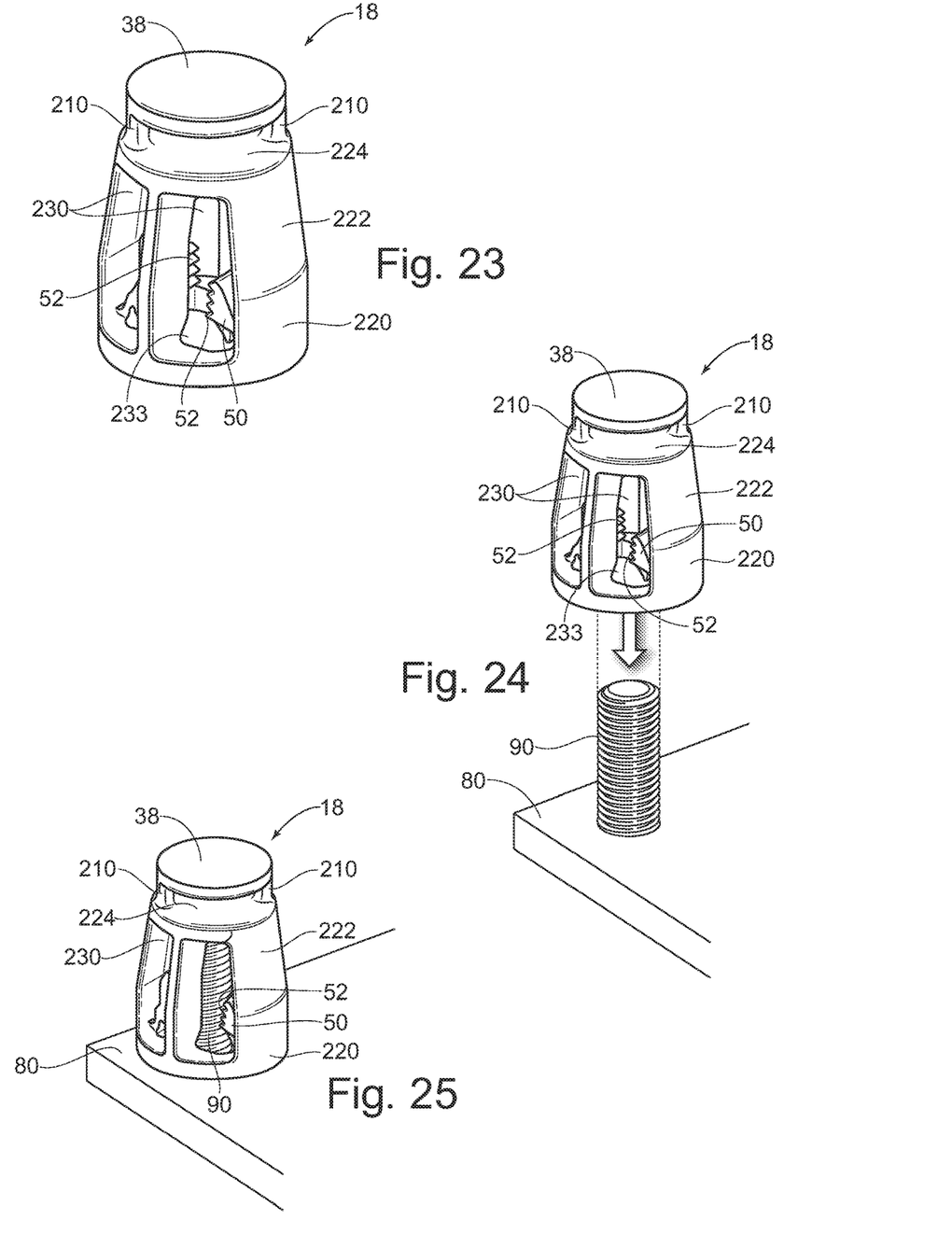
FIG. 23 is a perspective view showing a stud mount with self-centering support in accordance with a fifth embodiment of the invention.
FIG. 24 is a perspective view showing the stud mount of FIG. 23 being placed upon a threaded stud in accordance with the fifth embodiment of the invention.
FIG. 25 is a perspective view showing the stud mount of FIG. 23 placed upon a threaded stud in accordance with the fifth embodiment of the invention.

A fourth non-limiting example of a mounting device 410 is shown in FIGS. 18 through 22. The mounting device 410 has a body 420 with L-shaped through-holes 444. Mounting device 410 preferably includes two locking pawls 450 that oppose each other while engaging onto a threaded stud 90 and that can be viewed through the through-holes 444. The through-holes 444 allow access to the locking pawls 450 so that the locking pawls 450 may be released from the threaded stud 90, for example by using a tool to flex the locking pawls 450 away from the threaded stud 90, to allow removal of the mounting device 410 from the threaded stud 90. Mounting device 410 has a cavity 421 with a closed end and a predetermined inner diameter 434 for a close fit around threaded stud 90. The top surface 422 includes a pair of protrusions 428 that form a saddle-like support surface 430 for supporting an elongated member 60. The protrusions 428 also preferably includes cut-out side portions 429 designed in a particular geometry for ease of installation. Underneath support surface 430 is a channel 440 for cable ties 70 to be threaded through to secure the elongated member 60 to the mounting device 410. As shown in FIGS. 21 and 22, the cable tie 70 secures the elongated member 60 elevated above the threaded stud 90 and structural member 80. The elongated member 60 is positioned to longitudinally extend over each protrusion 428, and is on-center or in-line with the threaded stud 90 which is beneficial for harness routing purposes.

A fifth non-limiting example of a mounting device 510 is shown in FIGS. 23 through 29. The mounting device 510 has a cylindrical base portion 520 that tapers 527 toward the top surface 522 of the mounting device 510. Mounting device 510 includes rectangular through-holes 544, through which locking pawls 550 and threaded stud 90 can be viewed. Mounting device 510 preferably includes two locking pawls 550 with a plurality of teeth 552 designed to fit around at least two different threaded stud sizes (see FIGS. 26 and 29). Locking pawls 550 oppose each other while engaging onto a threaded stud 90. The through-holes 544 allow access to the locking pawls 550 so that the locking pawls 550 may be released from the threaded stud 90, for example by using a tool to flex the locking pawls 550 away from the threaded stud 90, to allow removal of the mounting device 510 from the threaded stud 90.

Figure 26:
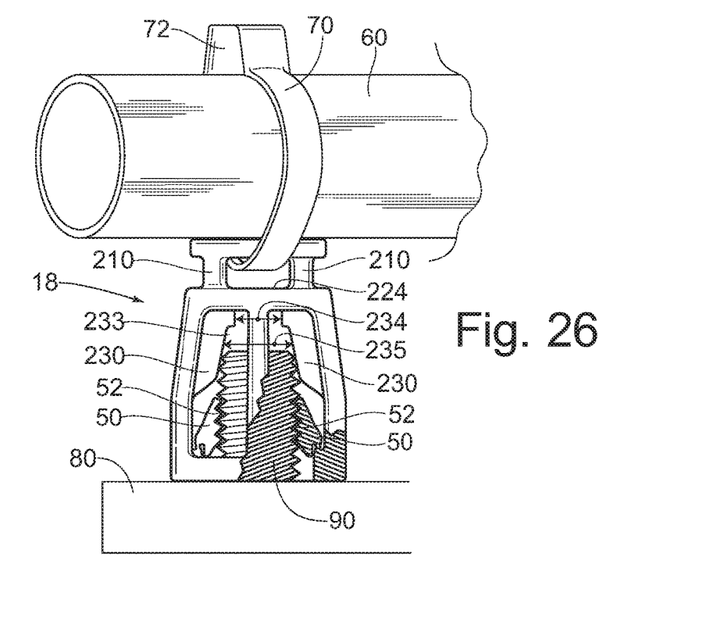
FIG. 26 is a perspective view of the stud mount of FIG. 23 supporting a single bundle and mounted on a larger diameter stud in accordance with the fifth embodiment of the invention.
Figure 27:
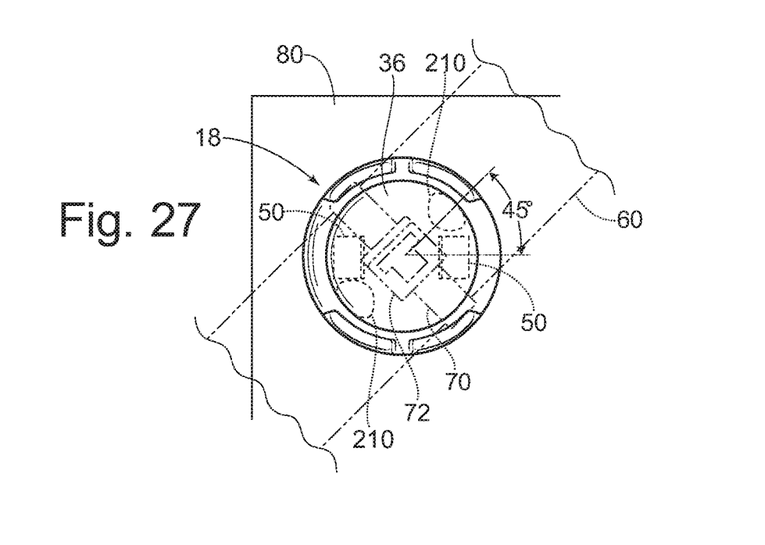
FIG. 27 is a top plan view of the stud mount of FIG. 26 with the single bundle and cable tie shown in phantom and the internal stud mount features shown in broken lines in accordance with the fifth embodiment of the invention.
Figure 28:
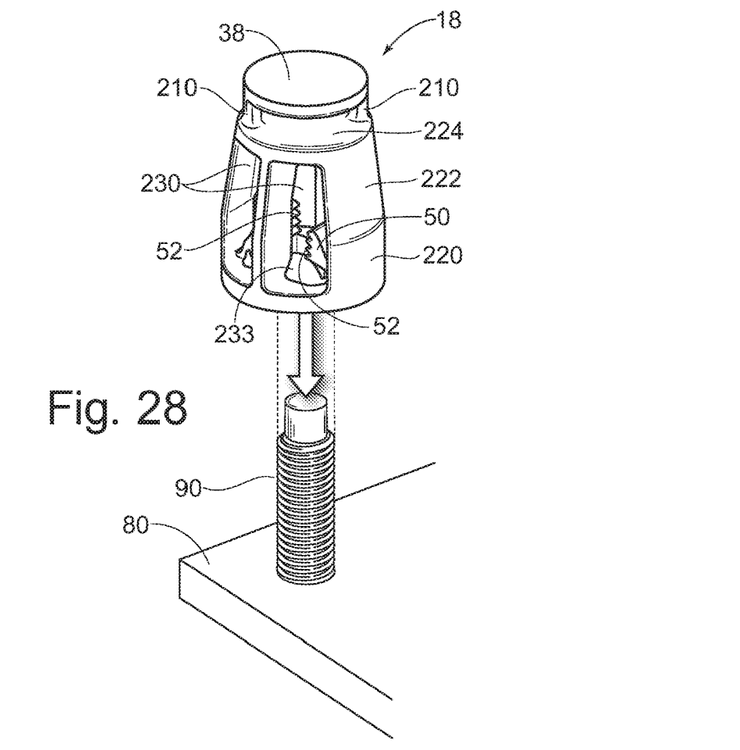
FIG. 28 is a perspective view of the stud mount of FIG. 23 being installed on a smaller diameter stud in accordance with the fifth embodiment of the invention.
Figure 29:
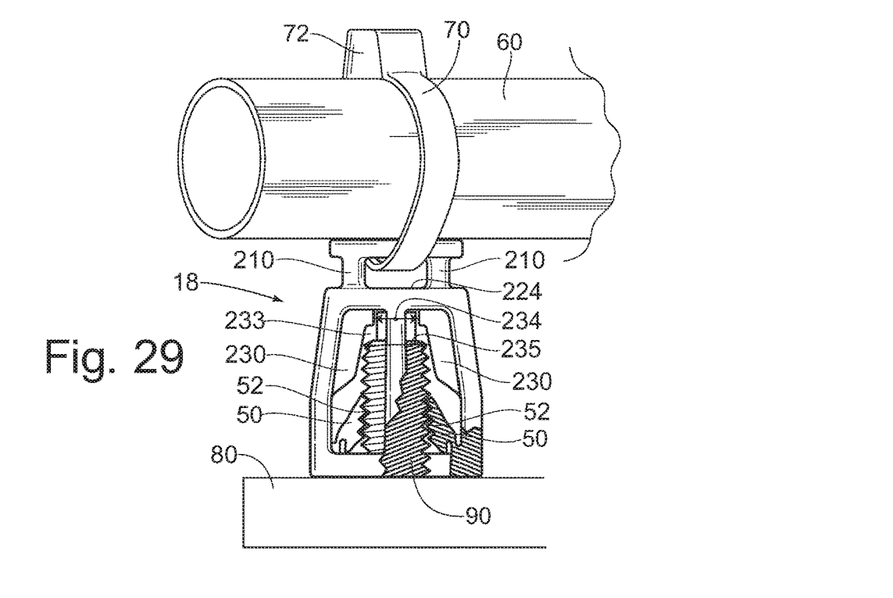
FIG. 29 is a perspective view of the stud mount of FIG. 23 supporting a single bundle and mounted on a smaller diameter stud in accordance with the fifth embodiment of the invention.

As best shown in FIG. 26, mounting device 510 has a cavity 521 with a closed end. A first portion 534 of the cavity 521 has a predetermined inner diameter for a close fit around threaded stud 90, and as shown best in FIG. 29 and a second portion 536 with a smaller inner diameter configured to fit a threaded stud having a smaller diameter than the threaded stud 90. The circular top surface 522 acts as a support surface for supporting an elongated member 60. Underneath top surface 522 there is a channel 540 that is defined between a pair of opposed standoffs 528 through which a cable tie 70 is threaded to secure the elongated member 60 to the mounting device 510. As shown in FIGS. 26 and 29, the cable tie 70 secures the elongated member 60 elevated above the threaded stud 90 and structural member 80. The elongated member 60 is positioned to longitudinally extend in-line with standoffs 528, and is on-center or in-line with the threaded stud 90 which is beneficial for harness routing purposes. The circular support surface 522, the standoffs 528, the channel 540, and the cable tie 70 cooperate to allow 90 degrees of rotational freedom of the elongated member 60 relative to the mounting device 510. This provides the benefit of rotational tolerance of the elongate element without the need to rotate the mounting device 510 which could tighten the mounting device 510 to the structural member 80 causing undesirable deflection of the pawls 550 or loosen the mounting device 510 from the structural member 80 allowing undesirable movement of the mounting device 510. The standoffs 528 allow 90° of rotational alignment freedom of the cable tie 70 in relation to the mounting device 510 in order to provide greater freedom in aligning the elongate structure 60 relative to the structural member 80. The standoffs 528 are preferably offset by a 45° rotation relative to the locking pawls 550.

While this invention has been described in terms of the preferred embodiments thereof, it is not intended to be so limited, but rather only to the extent set forth in the claims that follow. For example, other alternative embodiments may result by combining features of one of the above-described embodiments with any of the other above-described embodiments. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

In the following claims, the terms "including" and "in which" are used as the plain-English equivalents of the respective terms "comprising" and "wherein." Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

Further, the limitations of the following claims are not written in means-plus-function format and are not intended to be interpreted based on 35 USC § 112(f), unless and until such claim limitations expressly use the phrase "means for" followed by a statement of function void of further structure.

We claim:

1. A mounting device, comprising:
   a treaded stud;
   a body portion defining a cavity oriented along a longitudinal axis of the treaded stud having an opening in which the threaded stud is received, wherein the cavity defines a flexible pawl engaging a thread of the plurality of helical threads of the treaded stud, thereby securing the mounting device to the threaded stud;
   an elongate element;
   a flexible cable tie separate from the body portion having a cable tie strap and a cable tie head;
   a support portion arranged on a distal end of the body portion opposite the opening having a support surface engaging the elongate element and a first enclosed channel extending along a lateral axis generally perpendicular to the longitudinal axis, wherein the flexible cable tie is received within the first channel and extends along the lateral axis as the flexible cable tie is wrapped about the elongate element and the cable tie strap is inserted within the cable tie head, thereby securing the elongate element to the body portion.

2. A mounting device configured to secure an elongate element to a threaded stud using a flexible cable tie, said mounting device comprising:
   a body portion defining a cavity oriented along a longitudinal axis having an opening configured to receive the stud, wherein the cavity defines a flexible pawl configured to engage a thread of the plurality of helical threads, thereby securing the mounting device to the threaded stud;
   a support portion arranged on a distal end of the body portion opposite the opening having a support surface configured to engage the elongate element and a first enclosed channel arranged along a lateral axis generally perpendicular to the longitudinal axis, wherein the first channel defines a first pair of cable tie apertures configured to receive the flexible cable tie as it is wrapped about the elongate element, thereby securing the elongate element to the mounting device, wherein the support portion has a side support surface configured to engage the elongate element and wherein the support portion defines a fourth enclosed channel having an axis that is generally parallel to the longitudinal axis and generally parallel to the lateral axis and wherein the fourth channel defines a fourth pair of cable tie apertures configured to receive the flexible cable tie as it is wrapped about the elongate element, thereby securing the elongate element to the mounting device.

3. The mounting device according to claim 2, wherein each flexible pawl in the plurality of flexible pawls is arranged opposite another flexible pawl in the plurality of flexible pawls.

4. The mounting device according to claim 2, wherein the support portion has a side support surface configured to engage the elongate element, wherein the support portion defines a second enclosed channel having an axis that is generally perpendicular to the longitudinal axis and generally parallel to the lateral axis, and wherein the second channel defines a second pair of cable tie apertures configured to receive the flexible cable tie as it is wrapped about the elongate element, thereby securing the elongate element to the mounting device.

5. A mounting device configured to secure an elongate element to a threaded stud using a flexible cable tie, said mounting device comprising:
   a body portion defining a cavity oriented along a longitudinal axis having an opening configured to receive the stud, wherein the cavity defines a flexible pawl configured to engage a thread of the plurality of helical threads, thereby securing the mounting device to the threaded stud;
   a support portion arranged on a distal end of the body portion opposite the opening having a support surface configured to engage the elongate element and a first enclosed channel arranged along a lateral axis generally perpendicular to the longitudinal axis, wherein the first channel defines a first pair of cable tie apertures configured to receive the flexible cable tie as it is wrapped about the elongate element, thereby securing the elongate element to the mounting device, wherein the support portion has a side support surface configured to engage the elongate element, wherein the support portion defines a second enclosed channel having an axis that is generally perpendicular to the longitudinal axis and generally parallel to the lateral axis, and wherein the second channel defines a second pair of cable tie apertures configured to receive the flexible cable tie as it is wrapped about the elongate element, thereby securing the elongate element to the mounting device, wherein the support portion has another side support surface opposite the side support surface that is configured to engage the elongate element, wherein the support portion defines a third enclosed channel having an axis that is generally parallel to the second enclosed channel and wherein the third channel defines a third pair of cable tie apertures configured to receive the flexible cable tie as it is wrapped about the elongate element, thereby securing the elongate element to the mounting device.

6. The mounting device according to claim 2, wherein the cavity defines a plurality of flexible pawls configured to engage the thread of the plurality of helical threads.

7. The mounting device according to claim 2, wherein the support portion has another side support surface opposite the side support surface that is configured to engage the elongate element, wherein the support portion defines a fifth enclosed channel having an axis that is generally parallel to the fourth enclosed channel and wherein the fifth channel defines a fifth pair of cable tie apertures configured to receive the flexible cable tie as it is wrapped about the elongate element, thereby securing the elongate element to the mounting device.

8. The mounting device according to claim 2, wherein the side support surface is characterized as having a generally concave shape.

9. The mounting device according to claim 2, wherein the body portion is characterized as having a generally cylindrical shape.

10. The mounting device according to claim 2, wherein the body portion and the cavity is characterized as having an X-shaped cross section, wherein the cavity defines four flexible pawls configured to engage the thread of the plurality of helical threads, and wherein each leg of the X-shaped cavity defines one of the flexible pawls.

11. The mounting device according to claim 2, wherein the flexible pawl defines a plurality of teeth configured to engage the plurality of helical threads.

12. The mounting device according to claim 2, wherein the support surface is characterized as having a generally circular shape.

13. The mounting device according to claim 12, wherein the cavity defines another flexible pawl configured to engage a thread of the plurality of helical threads located opposite the flexible pawl and wherein the flexible pawl and the another flexible pawl are offset by 45 degrees from the lateral axis of the first channel.

14. The mounting device according to claim 5, wherein the cavity defines a plurality of flexible pawls configured to engage the thread of the plurality of helical threads.

15. The mounting device according to claim 5, wherein each flexible pawl in the plurality of flexible pawls is arranged opposite another flexible pawl in the plurality of flexible pawls.

16. The mounting device according to claim 5, wherein the body portion is characterized as having a generally cylindrical shape.

17. The mounting device according to claim 5, wherein the body portion and the cavity is characterized as having an X-shaped cross section, wherein the cavity defines four flexible pawls configured to engage the thread of the plurality of helical threads, and wherein each leg of the X-shaped cavity defines one of the flexible pawls.

18. The mounting device according to claim 5, wherein the flexible pawl defines a plurality of teeth configured to engage the plurality of helical threads.

19. The mounting device according to claim 5, wherein the support surface is characterized as having a generally circular shape.

20. The mounting device according to claim 19, wherein the cavity defines another flexible pawl configured to engage a thread of the plurality of helical threads located opposite the flexible pawl and wherein the flexible pawl and the another flexible pawl are offset by 45 degrees from the lateral axis of the first channel.

* * * * *